(No Model.)
O. O. OZIAS.
COMPUTING SCALE.
No. 576,468. Patented Feb. 2, 1897.
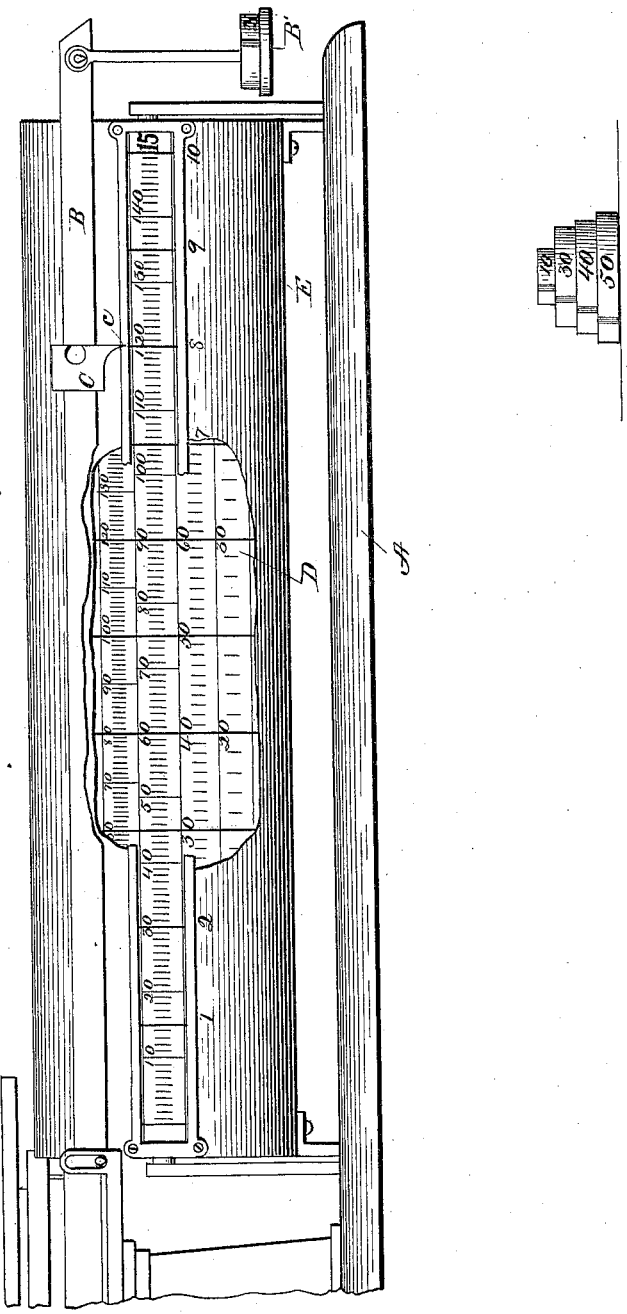
Witnesses:
J. M. Fowler Jr.
Thomas Durant
Inventor:
Orange O. Ozias,
by Church & Church
his Attorneys.

UNITED STATES PATENT OFFICE.

ORANGE O. OZIAS, OF DAYTON, OHIO.

COMPUTING-SCALE.

SPECIFICATION forming part of Letters Patent No. 576,468, dated February 2, 1897.

Application filed December 18, 1895. Serial No. 572,560. (No model.)

*To all whom it may concern:*

Be it known that I, ORANGE O. OZIAS, of Dayton, in the county of Montgomery and State of Ohio, have invented certain new and useful Improvements in Computing-Scales; and I do hereby declare the following to be a full, clear, and exact description of the same, reference being had to the accompanying drawing, forming a part of this specification, and to the letters of reference marked thereon.

This invention relates to improvements in that class of scales in which a balance-weight or sliding poise is employed, with an indicator to register with a graduated scale to indicate the cost of articles placed on the platform or receiver, such graduated scale usually being movable and having a series of sets of graduations thereon computed at different rates per unit; and it is the object of the invention to enlarge the capacity of such scales, whereby the cost or value of an article may be read instantly when its weight is greater than can be counterbalanced by the sliding poise, thereby necessitating the use of some one of a series of removable counterpoises or weights of different size.

The invention consists in a novel arrangement of the graduated indicating scale or scales for determining the cost price of articles balanced by any one of a number of removable counterpoises and also for determining the cost price of articles balanced by the sliding poise, all as will be hereinafter more fully explained, and pointed out in the appended claims.

The accompanying drawing illustrates in front elevation a pair of scales embodying my invention, a portion of the inclosing casing of the cylinder upon which the sets of indications are marked being broken away to illustrate the markings more clearly. It will, however, be obvious to those skilled in the art that any desired form of scales may be employed, and the value indications or computations may be indicated on any surface or body in position for the indicator to register therewith, and hence the form of scale shown and a cylinder with the indications marked thereon is employed only as a matter of preference and convenience in illustrating the invention.

The scales proper need no description further than to say that A is the platform, and B the beam upon which the sliding poise C slides. This sliding poise itself constitutes the indicator for registering with the sets of indications or cost graduations on the cylinder, for which purpose it may have a pointer or finger, such as c. On the end of the beam there is the usual pendant B' for removable counterpoise-weights.

The cylinder D is shown as confined within a housing or casing E and supported on the base, although it may be on the beam or other moving part of the scale, as in other scales of this general class.

The surface of the cylinder D is divided by a series of sets of graduations into spaces indicating fractional parts and multiples of the prices per unit. In the illustration the rate at the opening is fifteen cents per pound, as shown by the figures at the extreme right, and the major indications in said set are marked "10," "20," "30," and so on up to "140," these figures being the cost price of articles balanced by the sliding poise when the indicator registers therewith. The number of minor or fractional graduated spaces varies with the rate price, being wider in the set for lower unit prices and narrower for the higher unit prices, all as in other computing tables heretofore made.

In order now to enable removable supplemental weights to be employed and the cost price of articles balanced thereby, with or without the sliding poise, to be read at a glance, I form on the surface of the cylinder or table a supplemental set of distinctive graduations, preferably extending entirely across the table or rate graduations. These supplemental graduations in the illustration are marked on the casing from "1" to "10," inclusive, and the supplemental or removable counterpoise-weights are preferably numbered to correspond to these graduation-marks. These supplemental or distinctive graduations and the rate per unit graduations are so proportioned to each other that the cost of articles balanced by any one of the supplemental or removable counterpoise-weights will be shown by the figures on the rate per unit graduations at the point where the supplemental graduation numbered for that weight intersects the said rate per unit graduations when said figures are multiplied by ten or a cipher added thereto. For example, if an article weighing sufficient to balance the next to the lightest, or No. 20 weight, is placed on the platform an inspection of the distinctive graduation, "No. 2," shows the figure "30," and this multiplied by ten, or a cipher added, gives "$3.00." Should the article have been slightly heavier than this and the sliding poise have been brought into use to secure the balance, then the cost indication registering with the indicator is added to the three dollars, thus, say the sliding poise had stopped at "50," the user would see at once without further computation that the total cost was three dollars and fifty cents.

For convenience the supplemental or distinctive graduations are regularly spaced and indicate pounds when read in connection with the sliding poise. The scales in the example illustrated has therefore a capacity of ten pounds, and the supplemental or removable counterpoise-weights are for ten, twenty, thirty pounds, &c., up to one hundred pounds, if so desired, corresponding in number to the number of graduations and increasing the capacity of the scale for computing up to one hundred and ten pounds.

It will be noted that each of the distinctive graduations gives the value of its supplemental or removable weight in each of the sets of price per unit graduations, this result being attained by forming a number of graduations between each two distinctive marks corresponding to the rate per unit. Thus when the rate is ten cents per pound there are ten spaces between the distinctive or supplemental graduations, and when the rate is twenty cents per pound there are twenty spaces between such graduations, &c.

In the example illustrated the prices per unit for the four sets of graduations shown are five, ten, fifteen, and twenty cents per pound, and if, for instance, the fourth or forty-pound weight be added to the beam it will be seen at the point where the casing is broken away that its value in the respective scales will be two, four, six, and eight dollars, respectively.

The invention may be applied to any of the computing-tables now in use on computing-scales, and hence I do not wish to limit my invention to the particular embodiment illustrated or to any particular mechanical embodiment.

Having thus described my invention, what I claim as new is—

1. A price-indicating scale for computing-scales, having a series of sets of graduations for indicating cost of articles balanced by the sliding poise, and supplemental or distinctive graduations in each of said sets, each distinctive graduation indicating in each of the sets of cost graduations a decimal-fractional part of the cost of articles balanced by one of the removable counterpoise-weights; substantially as described.

2. A price-indicating scale for computing-scales, having a series of sets of graduations for indicating cost of articles balanced by the sliding poise, and a series of regularly-spaced supplemental or distinctive graduations extending transversely through each of the series of sets of graduations and each distinctive graduation indicating in each set a decimal-fractional part of the cost of articles balanced by a removable counterpoise-weight corresponding to that graduation; substantially as described.

3. In a price-scale, the combination with the platform, beam, poise sliding on the beam and the series of graduated scales with which the poise registers to indicate the cost at different rates per unit, of a series of removable counterpoise-weights and a distinctive set of regularly-spaced graduations extending transversely of all the first-mentioned series of graduated scales and each distinctive graduation indicating a decimal-fractional part of the value of articles balanced by one of the removable counterpoise-weights in all of the scales; substantially as described.

4. In a computing-scale, the combination with the platform, beam, poise sliding on the beam and series of removable counterpoise-weights, of the rotary member having the series of sets of graduations thereon with which the sliding poise registers to indicate cost prices at different rates per unit with a supplemental or distinctive set of graduations extending around the rotary member and intersecting the first-mentioned sets, each distinctive graduation indicating in each scale a decimal-fractional part of the value of articles balanced by one of the removable counterpoise-weights and indications showing which graduation is to be read in connection with any particular removable weight; substantially as described.

ORANGE O. OZIAS.

Witnesses:
B. A. COOKE,
A. G. JOHNSON.